(12) United States Patent
Otani

(10) Patent No.: US 9,355,639 B2
(45) Date of Patent: May 31, 2016

(54) CANDIDATE SELECTION APPARATUS AND CANDIDATE SELECTION METHOD UTILIZING VOICE RECOGNITION

(71) Applicant: ALPINE ELECTRONICS, INC., Shinagawa-ku, Tokyo (JP)

(72) Inventor: Michiaki Otani, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 39 days.

(21) Appl. No.: 14/229,265

(22) Filed: Mar. 28, 2014

(65) Prior Publication Data

US 2014/0358542 A1 Dec. 4, 2014

(30) Foreign Application Priority Data

Jun. 4, 2013 (JP) ................................. 2013-117525

(51) Int. Cl.
*G10L 15/22* (2006.01)
*G10L 15/26* (2006.01)
*G10L 15/30* (2013.01)

(52) U.S. Cl.
CPC ...................................... *G10L 15/22* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,329,609 A * | 7/1994 | Sanada | .................... | G10L 15/22 704/235 |
| 5,764,731 A * | 6/1998 | Yablon | .................. | H04M 1/271 379/213.01 |
| 6,067,521 A * | 5/2000 | Ishii | ........................ | G10L 15/22 701/532 |
| 6,253,174 B1 * | 6/2001 | Ishii | .................... | G01C 21/3608 704/231 |
| 6,411,893 B2 * | 6/2002 | Ruhl | .......................... | 379/88.01 |
| 6,598,016 B1 * | 7/2003 | Zavoli | ................ | G01C 21/3608 704/251 |
| 6,601,027 B1 * | 7/2003 | Wright | ...................... | G06F 3/16 704/235 |
| 6,785,366 B1 * | 8/2004 | Nobuta | .................. | H04M 1/271 379/88.01 |
| 8,255,216 B2 * | 8/2012 | White | ..................... | G10L 15/08 704/236 |
| 8,849,835 B1 * | 9/2014 | Carmi | ............... | G06F 17/30303 707/730 |
| 8,903,651 B2 * | 12/2014 | Homma | .............. | G10L 21/0208 701/419 |
| 2002/0046027 A1 * | 4/2002 | Tamura | .............. | G01C 21/3608 704/250 |
| 2004/0243403 A1 * | 12/2004 | Matsunaga | ............. | G06F 17/27 704/209 |
| 2005/0043949 A1 * | 2/2005 | Roth | ....................... | G10L 15/22 704/251 |
| 2005/0131686 A1 * | 6/2005 | Yamamoto | ............ | G10L 15/197 704/231 |

(Continued)

FOREIGN PATENT DOCUMENTS

JP 2000-250587 9/2000

*Primary Examiner* — Pierre-Louis Desir
*Assistant Examiner* — Jonathan Kim
(74) *Attorney, Agent, or Firm* — Brinks Gilson & Lione

(57) ABSTRACT

A candidate selection apparatus utilizing voice recognition includes an association unit that associates target candidates with candidate numbers so that numerals of the target candidates coincide with numerals of the candidate numbers when the target candidates to be displayed in list form are character strings representing the numerals of the candidate numbers, and a display control unit that displays the target candidates and the candidate numbers in list form in accordance with the associations made between the target candidates and the candidate numbers.

8 Claims, 6 Drawing Sheets

(56) References Cited

U.S. PATENT DOCUMENTS

| | | | |
|---|---|---|---|
| 2006/0229870 A1* | 10/2006 | Kobal | G10L 15/22 704/252 |
| 2007/0094021 A1* | 4/2007 | Bossemeyer, Jr. | G10L 17/22 704/249 |
| 2008/0030300 A1* | 2/2008 | Naito | G06Q 30/02 340/5.1 |
| 2008/0167872 A1* | 7/2008 | Okimoto | G10L 15/22 704/251 |
| 2009/0234568 A1* | 9/2009 | Kawauchi | G01C 21/3611 701/532 |
| 2010/0049696 A1* | 2/2010 | Lokshin | G06F 17/30241 701/533 |
| 2011/0022393 A1* | 1/2011 | Waller | G01C 21/3608 704/270 |
| 2011/0231191 A1* | 9/2011 | Miyazaki | G01C 21/3608 704/243 |
| 2014/0013261 A1* | 1/2014 | Shibata | G01C 21/26 715/771 |
| 2014/0297281 A1* | 10/2014 | Togawa | G10L 15/22 704/251 |

* cited by examiner

FIG. 2A

| CANDIDATE NUMBER | RECOGNITION ID |
|---|---|
| 1 | ID1 |
| 2 | ID2 |
| 3 | ID3 |
| 4 | ID4 |
| 5 | ID5 |
| 6 | ID6 |

FIG. 2B

| TARGET CANDIDATE | RECOGNITION ID |
|---|---|
| CALIFORNIA | ID1 |
| COLORADO | ID2 |
| CONNECTICUT | ID3 |
| DELAWARE | ID4 |
| DISTRICT OF COLUMBIA | ID5 |
| FLORIDA | ID6 |

FIG. 3A

| CANDIDATE NUMBER | RECOGNITION ID |
|---|---|
| 1 | ID1 |
| 2 | ID2 |
| 3 | ID3 |
| 4 | ID4 |
| 5 | ID5 |
| 6 | ID6 |

FIG. 3B

| TARGET CANDIDATE | RECOGNITION ID |
|---|---|
| 1 | ID1 |
| 2 | ID2 |
| 3 | ID3 |
|  | ID4 |
| 5 | ID5 |
|  | ID6 |

FIG. 8

| 1 | CALIFORNIA |
| 2 | COLORADO |
| 3 | CONNECTICUT |
| 4 | DELAWARE |
| 5 | DISTRICT OF COLUMBIA |
| 6 | FLORIDA |

FIG. 9

| 1 | 1 |
| 2 | 2 |
| 3 | 3 |
| 4 | ⑤ |
| ⑤ | 7 |
| 6 | 9 |

CANDIDATE SELECTION APPARATUS AND CANDIDATE SELECTION METHOD UTILIZING VOICE RECOGNITION

RELATED APPLICATION

The present application claims priority to Japanese Patent Application Number 2013-117525, filed Jun. 4, 2013, the entirety of which is hereby incorporated by reference.

BACKGROUND

1. Field of the Invention

The present invention relates to a candidate selection apparatus and a candidate selection method utilizing voice recognition, and is particularly suitable for use in a candidate selection apparatus that enables selection of a target candidate by performing voice recognition of either the target candidate or a candidate number assigned to the target candidate, spoken by a user from among target candidates and candidate numbers that are displayed in list form.

2. Description of the Related Art

Most vehicles are equipped with various electronic devices, such as an audio device, an air conditioner, and a navigation device. Hitherto, in order to avoid, for example, driving with one hand on the wheel when operating these electronic devices, there has been provided a system in which an electronic device is operated by using voice recognition.

A voice recognition system typically recognizes, as a speech command, a specific word or phrase, a simple statement, or the like that has been spoken by a user, and supplies a recognition result of the speech command to an application of an electronic device. In response to this, the application performs control corresponding to the recognition result. For example, when an address search for a destination is made as an application of a navigation device, an address identified by using voice recognition is input to the navigation device, and then the address is able to be set as a search key for a facility.

Hitherto, there has been provided a technique in which, as illustrated in FIG. 8, when a user sets an address or the like by using voice recognition, a candidate number is assigned to each of a plurality of candidates displayed in list form as targets for voice recognition, the user says a candidate number, and thus a target candidate corresponding to the candidate number may be selected (see, for example, Japanese Unexamined Patent Application Publication No. 2000-250587). Also, there has been provided a technique in which a target candidate may be selected by saying the name or the like of the target candidate directly in addition to saying a candidate number. For example, in the example in FIG. 8, in the case where the user wants to select "Florida", when the user says the sixth candidate number "six" or the name of the target candidate "Florida", "Florida" may be selected.

However, as illustrated in FIG. 9, for example, in the case where candidate numbers are assigned to target candidates which are numerals, such as street numbers (or house numbers) of addresses in the United States, because candidate numbers in ascending order are sequentially assigned to a plurality of target candidates displayed in list form from the top, some candidate numbers do not coincide with numerals of street numbers (target candidates).

In this case, there is a problem in that, in such a voice recognition system, it is not able to be determined whether a numeral said by the user is a candidate number or a street number (target candidate) and false recognition occurs. For example, in the example in FIG. 9, when the user says "five", the voice recognition system is not able to determine whether the "five" refers to "7" displayed in a fifth item in a list or "5" displayed in a fourth item in the list.

The present invention has been accomplished in order to solve such a problem. In a system that enables selection of a target candidate by saying either the target candidate or a candidate number assigned to the target candidate, displayed in a list, an object of embodiments of the present invention is to enable voice recognition of a target candidate to be selected by a user to be correctly performed at all times in the case where character strings representing numerals are displayed as target candidates in list form.

SUMMARY

In order to solve the above problem, in an embodiment of the present invention, in the case where target candidates to be displayed in list form are character strings representing numerals of candidate numbers, the target candidates are associated with the candidate numbers so that numerals of the target candidates coincide with the numerals of the candidate numbers, and the target candidates and the candidate numbers are displayed in list form in accordance with the associations made between them.

Accordingly, in the case where a user selects and says either a target candidate or a candidate number from among target candidates and candidate numbers that are displayed in list form, regardless of whether the target candidate is spoken, or the candidate number is spoken, since a numeral of the target candidate and a numeral of the candidate number coincide with each other, the apparatus does not need to determine whether a numeral spoken by the user is the numeral of the candidate number or the numeral of the target candidate, and thus the user may select a correct target candidate by using voice recognition.

BRIEF DESCRIPTION OF THE DRAWINGS

FIGS. 2A and 2B each illustrate details of associations made by an association unit according to the embodiment;

FIGS. 3A and 3B each illustrate details of associations made by the association unit according to the embodiment;

FIG. 8 illustrates an example of an existing list display; and

FIG. 9 illustrates an example of an existing list display.

DETAILED DESCRIPTION OF THE PREFERRED EMBODIMENTS

Figure 1:
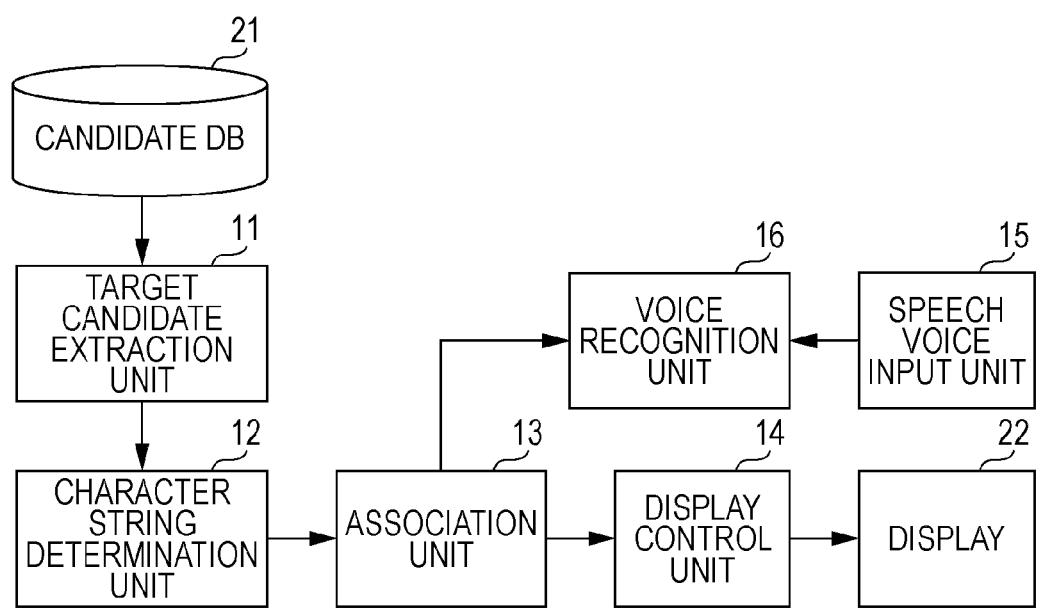
FIG. 1 is a block diagram illustrating an example of a functional configuration of a candidate selection apparatus utilizing voice recognition according to an embodiment.

An embodiment of the present invention will be described below with reference to the drawings. FIG. 1 is a block diagram illustrating an example of a functional configuration of a candidate selection apparatus utilizing voice recognition according to the embodiment. As illustrated in FIG. 1, the candidate selection apparatus according to the embodiment includes, as functional components, a target candidate extraction unit 11, a character string determination unit 12, an association unit 13, a display control unit 14, a speech voice input unit 15, and a voice recognition unit 16.

The above-described functional blocks 11 to 16 are able to be realized by any of hardware, a digital signal processor (DSP), and/or software. For example, in the case where the functional blocks 11 to 16 are realized by software, the functional blocks 11 to 16 are actually equipped with a central processing unit (CPU), a random access memory (RAM), a read only memory (ROM), and the like which are included in a computer, and the functional blocks 11 to 16 are implemented by causing a program stored in the RAM or ROM, a hard disk, or a recording medium, such as a semiconductor memory, to run.

The target candidate extraction unit 11 extracts, from a candidate database 21, a plurality of target candidates to be displayed in list form. For example, in the case where the candidate selection apparatus according to the embodiment is applied to a navigation device, the candidate database 21 is a map database. In the case where an intended facility is searched for on the basis of an address and set as a destination, the target candidate extraction unit 11 sequentially extracts, as target candidates, prefectures, names of administrative districts of cities/wards/towns/villages, town names (○○x-chome), block numbers (xx-ban), and house numbers (xx-gou). Here, "chome", "ban", and "gou" are alphabetical characters representing Japanese phonetic sounds.

That is, the target candidate extraction unit 11 first extracts, as target candidates, names of prefectures from the candidate database 21. An extracted plurality of target candidates are displayed in list form on a display 22 by the display control unit 14 as described later. When a target candidate is selected from among the plurality of target candidates displayed in list form by a user by using voice recognition, the target candidate extraction unit 11 then extracts, as subsequent target candidates, names of cities/wards/towns/villages belonging to the selected prefecture from the candidate database 21.

A plurality of target candidates regarding cities/wards/towns/villages extracted here are displayed in list form on the display 22 in place of the previously displayed target candidates regarding prefectures. When a target candidate is selected from among the plurality of target candidates by the user, the target candidate extraction unit 11 then extracts, as target candidates, town names belonging to the selected city/ward/town/village. In the same manner, the target candidate extraction unit 11 sequentially extracts block numbers and house numbers in accordance with the selection of target candidates made by the user. In the case of a map database designed to meet specifications for, for example, the United States, a street number is also among target candidates.

The character string determination unit 12 determines whether or not target candidates extracted by the target candidate extraction unit 11 are character strings representing numerals of candidate numbers. Target candidates corresponding to character strings representing numerals of candidate numbers are street numbers, block numbers, and house numbers. In the embodiment, six target candidates are displayed in a list. In this case, when each of the target candidates to be displayed in list form is any of a street number, a block number, and a house number, and also when the numbers of streets, blocks, or houses are each any of "1" to "6", the character string determination unit 12 determines that the target candidates are character strings representing numerals of candidate numbers.

A town name does not serve as a target candidate in a form of "○○x-chome", but "○○x-chome" is divided into two parts: "○○" and "x-chome", and these parts serve as target candidates separately. In the case where a numeral "x" is simply displayed in a list as the part "x-chome", when a value of "x" is any of "1" to "6", the character string determination unit 12 determines that a target candidate is a character string representing a numeral of a candidate number.

The association unit 13 associates six candidate numbers "1" to "6" with six target candidates to be displayed in list form for the six candidate numbers. FIGS. 2A, 2B and 3A, 3B each illustrate details of associations made by the association unit 13. For example, when a list display like that illustrated in FIG. 8 is to be provided, the association unit 13 makes associations as illustrated in FIGS. 2A and 2B.

In the embodiment, a target candidate may be selected by performing voice recognition of either a candidate number or the target candidate, spoken by the user from among candidate numbers and target candidates that are displayed in list form. Thus, two types of associations are made, that is, a candidate number is associated with a recognition ID as illustrated in FIG. 2A, and a target candidate is associated with a recognition ID as illustrated in FIG. 2B.

Here, a recognition ID is identification information to be output as a result of voice recognition by the voice recognition unit 16. In the case of an example illustrated in FIGS. 2A and 2B, regardless of whether the user says, for example, "one" or "California", the voice recognition unit 16 outputs "ID1" as a recognition ID representing a recognition result.

When the character string determination unit 12 determines that target candidates to be displayed in list form are character strings representing numerals of candidate numbers, the association unit 13 associates the target candidates with the candidate numbers so that numerals of the target candidates coincide with the numerals of the candidate numbers. FIGS. 3A and 3B each illustrate details of the associations.

FIG. 3A illustrates details in which six candidate numbers "1" to "6" are associated with six recognition IDs "ID1" to "ID6", and the details are the same as those in FIG. 2A. In the case of specifications in which candidate numbers are fixed at "1" to "6" even when target candidates displayed in list form are scrolled, details of associations made between the candidate numbers and recognition IDs are fixed at all times and not changed.

FIG. 3B illustrates a state in which target candidates (street numbers, block numbers, house numbers, or the like) corresponding to character strings representing numerals of candidate numbers are associated with recognition IDs. In an example illustrated in FIG. 3B, four target candidates corresponding to character strings representing numerals of candidate numbers are "1", "2", "3", and "5". In this case, the association unit 13 associates the four target candidates "1", "2", "3", and "5" with four recognition IDs "ID1", "ID2", "ID3", and "ID5" so that numerals of the target candidates coincide with the numerals of the candidate numbers.

In the example illustrated in FIG. 3B, there are no target candidates corresponding to character strings representing numerals "4" and "6" of candidate numbers. In this case, the association unit 13 does not associate recognition IDs corresponding to the numerals to which there are no target candidates corresponding with any target candidates. That is, only the target candidates "1", "2", "3", and "5" corresponding to character strings representing numerals coinciding with the numerals of the candidate numbers are associated with the recognition IDs "ID1", "ID2", "ID3", and "ID5".

Figure 4:
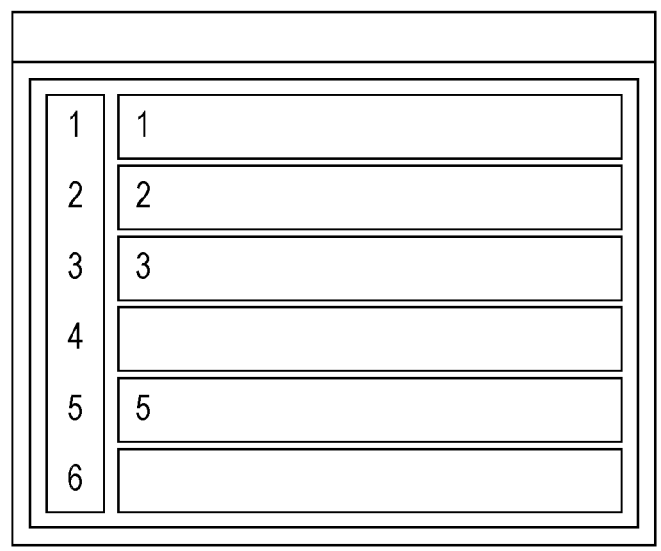
FIG. 4 illustrates an example of a list display of candidate numbers and target candidates provided by a display control unit according to the embodiment.

The display control unit 14 displays target candidates and candidate numbers associated with each other by the association unit 13 in list form on the display 22 in accordance with the associations made between them. For example, when associations are made by the association unit 13 as illustrated in FIGS. 2A and 2B, the display control unit 14 associates six target candidates with six candidate numbers "1" to "6" so as to display the target candidates and the candidate numbers in list form as illustrated in FIG. 8. When associations are made by the association unit 13 as illustrated in FIGS. 3A and 3B, the display control unit 14 associates four target candidates "1", "2", "3", and "5" with four candidate numbers "1", "2", "3", and "5" so as to display the target candidates and the candidate numbers in list form as illustrated in FIG. 4.

The speech voice input unit 15 inputs, via a microphone, which is not illustrated, a voice of a target candidate or candidate number spoken by the user from among target candidates and candidate numbers that are displayed in list form by the display control unit 14. The voice recognition unit 16 performs voice recognition of a speech voice input by the speech voice input unit 15, and outputs, as a result of the voice recognition, a recognition ID associated with the recognized target candidate or candidate number by the association unit 13.

Figure 5:
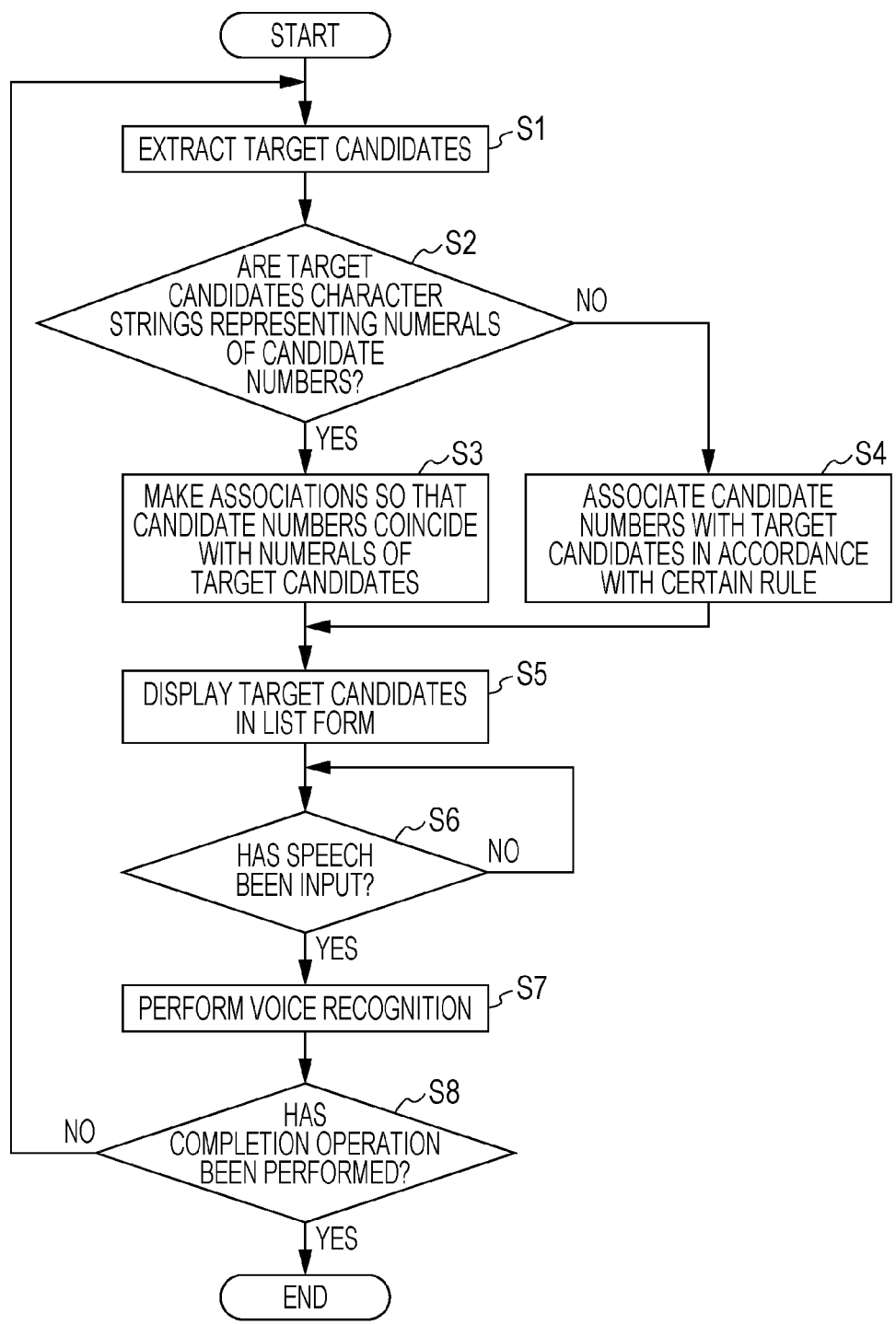
FIG. 5 is a flowchart illustrating an example of operations performed by the candidate selection apparatus according to the embodiment.

FIG. 5 is a flowchart illustrating an example of operations performed by the candidate selection apparatus according to the embodiment having the above-described configuration. In the flowchart illustrated in FIG. 5, a process starts when an address search for a destination utilizing voice recognition is designated as an application of the navigation device.

First, the target candidate extraction unit 11 extracts a plurality of target candidates to be displayed in list form on the display 22 from the candidate database 21 (step S1). Then, the character string determination unit 12 determines whether or not the target candidates extracted by the target candidate extraction unit 11 are character strings representing numerals of candidate numbers (step S2). That is, the character string determination unit 12 determines whether or not each of the target candidates is any of a street number, a block number, and a house number, and also determines whether or not the numbers of streets, blocks, or houses are any of "1" to "6".

Here, when the character string determination unit 12 determines that the target candidates to be displayed in list form are character strings representing numerals of candidate numbers, the association unit 13 associates the target candidates with the candidate numbers so that numerals of the target candidates coincide with the numerals of the candidate numbers (step S3). On the other hand, when the character string determination unit 12 determines that the target candidates to be displayed in list form are not character strings representing numerals of candidate numbers, the association unit 13 associates the target candidates with the candidate numbers in accordance with a certain rule (step S4). For example, the plurality of target candidates are listed in the order of the Japanese syllabary or in alphabetical order, and then are respectively associated with candidate numbers in ascending order.

Then, the display control unit 14 displays the target candidates and the candidate numbers associated with each other by the association unit 13 in either step S3 or step S4 in list form on the display 22 in accordance with the associations made between them (step S5). In this state, the voice recognition unit 16 determines whether or not a speech voice from the user has been input by the speech voice input unit 15 (step S6).

When a speech voice has been input, the voice recognition unit 16 performs voice recognition of a target candidate or candidate number spoken by the user, and outputs, as a result of the voice recognition, a recognition ID associated with the recognized target candidate or candidate number (step S7). Subsequently, the target candidate extraction unit 11 determines whether or not an operation for completing setting of an address serving as a search key for a destination has been performed (step S8). The operation for completing the setting of the address is, for example, an operation in which an execute button for an address search is operated.

When the execute button for an address search has not been operated, the process returns to step S1. In this case, the target candidate extraction unit 11 extracts, in response to the result of the voice recognition output in step S7, a plurality of target candidates belonging to a layer lower than the recognized target candidate (for example, in the case where the recognized target candidate is a prefecture, target candidates regarding cities/wards/towns/villages belonging to the prefecture). Then, a process similar to the above-described process is performed. On the other hand, when the execute button for an address search has been operated, the process in the flowchart illustrated in FIG. 5 ends.

As described in detail above, in the embodiment, in the case where target candidates to be displayed in list form on the display 22 are character strings representing numerals of candidate numbers, the target candidates are associated with the candidate numbers so that numerals of the target candidates coincide with the numerals of the candidate numbers, and the target candidates and the candidate numbers are displayed in list form in accordance with the associations made between them.

According to the embodiment having such a configuration, in the case where a user selects and says either a target candidate or a candidate number from among target candidates and candidate numbers that are displayed in list form, regardless of whether the target candidate is spoken or the candidate number is spoken, since a numeral of the target candidate and a numeral of the candidate number coincide with each other, the voice recognition unit 16 does not need to determine whether a numeral spoken by the user is the numeral of the candidate number or the numeral of the target candidate, and thus the user may select a correct target candidate by using voice recognition. Furthermore, this may suppress the occurrence of false recognition, and also enhance usability because the user may say a numeral without caring whether the numeral is a candidate number or a target candidate.

Figure 6:
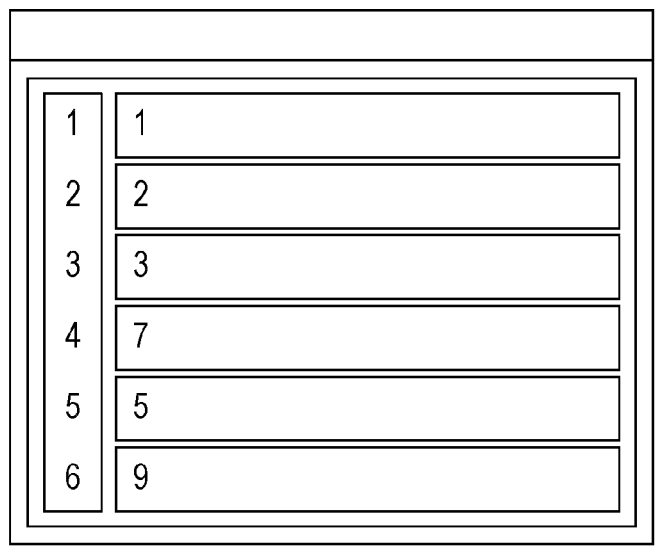
FIG. 6 illustrates a modification of a list display of candidate numbers and target candidates provided by the display control unit according to the embodiment.

In the above embodiment, in the case where there is no target candidate corresponding to a character string representing a numeral of a candidate number, an example has been described in which the candidate number corresponding to the numeral is not associated with any target candidate; however, the present invention is not limited to this. For example, as illustrated in FIG. 6, in the case where there is no target candidate corresponding to a character string representing a numeral of a candidate number, the candidate number corresponding to the numeral may be associated with a target candidate corresponding to a character string representing a numeral other than the numeral of the candidate number.

Figure 7:
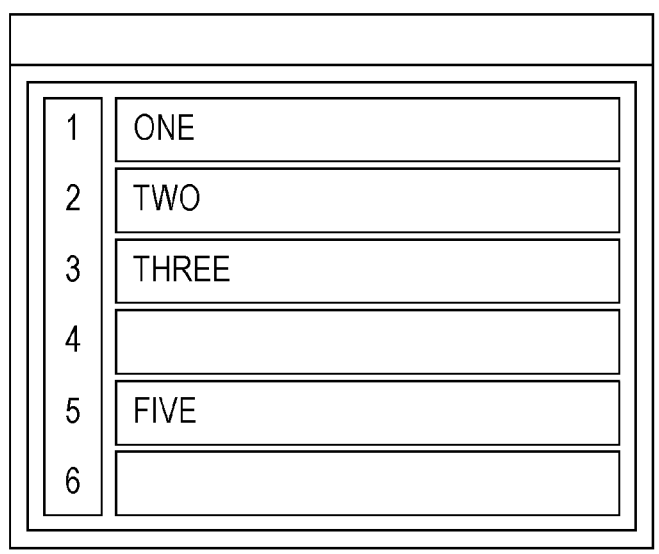
FIG. 7 illustrates a modification of a list display of candidate numbers and target candidates provided by the display control unit according to the embodiment.

In the above embodiment, an example has been described in which a character string of a target candidate that represents a numeral of a candidate number is presented with a numeral itself; however, the present invention is not limited to this. For example, as illustrated in FIG. 7, a character string of a target candidate may be presented with a word representing a numeral, or alternatively, may be presented with Japanese phonetic characters representing a numeral.

In the above embodiment, an example has been described in which numerals of candidate numbers are fixed at "1" to "6"; however, the present invention is not limited to this. For example, when target candidates are scrolled to be displayed, numerals of candidate numbers may also be scrolled in accordance with the scrolling and may be changed.

In the above embodiment, the above description has been made by taking, as an example, the application for making an address search in the navigation device; however, the present invention may be applied to an application other than the foregoing application, for example, a music search in an audio device (especially, a music title search).

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A candidate selection apparatus utilizing voice recognition that enables selection of a target candidate from a plurality of target candidates displayed in a numbered list form by performing voice recognition of either the selected target candidate or a candidate number of the numbered list assigned to the selected target candidate, spoken by a user from among target candidates and candidate numbers that are displayed in list form, the candidate selection apparatus comprising:
   a character string determination unit that determines whether or not a character string of a target candidate to be displayed in a numbered list represents a numeral that is the same as a candidate number of the list, where the target candidates to be displayed in the list represent choices available for selection by the user, and the candidate numbers are the numerals of the numbered list;
   an association unit that associates target candidates with the candidate numbers of the numbered list so that numerals of the target candidates are the same as the numerals of the candidate numbers when the character string determination unit determines that a character string of a target candidate to be displayed in the numbered list represents the numeral of a candidate number of the list;
   a display control unit that displays the target candidates and the candidate numbers associated with each other by the association unit in list form in accordance with associations made between the target candidates and the candidate numbers of the list; and
   a voice recognition unit that performs voice recognition of the target candidate or the candidate number spoken by the user from among the target candidates and the candidate numbers that are displayed in list form by the display control unit, whereby a spoken target candidate recognized by the voice recognition unit or a target candidate associated with a spoken candidate number recognized by the voice recognition unit is selected by the candidate selection apparatus from among the target candidates displayed in list form.

2. The candidate selection apparatus utilizing voice recognition according to claim 1, wherein, when there is no target candidate corresponding to a character string representing a numeral of a candidate number, the association unit does not associate the candidate number corresponding to the numeral with any target candidate, and associates only a target candidate corresponding to a character string representing a numeral coinciding with a numeral of a candidate number with the candidate number whose numeral coincides with the numeral.

3. The candidate selection apparatus utilizing voice recognition according to claim 1, wherein, when there is no target candidate corresponding to a character string representing a numeral of a candidate number, the association unit associates the candidate number corresponding to the numeral with a target candidate corresponding to a character string representing a numeral other than the numeral of the candidate number.

4. The candidate selection apparatus utilizing voice recognition according to claim 1, wherein the target candidates corresponding to the character strings representing the numerals of the candidate numbers include a street number, block number, or house number.

5. A candidate selection method utilizing voice recognition that enables selection of a target candidate from a plurality of target candidates displayed in a numbered list form by performing voice recognition of either the selected target candidate or a candidate number of the numbered list assigned to the selected target candidate, spoken by a user from among target candidates and candidate numbers that are displayed in list form, the candidate selection method comprising:
   a first step of, with a character string determination unit comprising a computer, determining whether or not a character string of a target candidate to be displayed in a numbered list represents a numeral that is the same as a candidate number of the list, where the target candidates to be displayed in the list represent choices available for selection by the user, and the candidate numbers are the numerals of the numbered list;
   a second step of, with an association unit comprising a computer, associating target candidates with the candidate numbers of the numbered list so that numerals of the target candidates are the same as the numerals of the candidate numbers when the character string determination unit determines that a character string of a target candidate to be displayed in the numbered list represents the numeral of a candidate number of the list;
   a third step of, with a display control unit comprising a computer, displaying the target candidates and the candidate numbers associated with each other by the association unit in list form in accordance with associations made between the target candidates and the candidate numbers of the list; and
   a fourth step of, with a voice recognition unit comprising a computer, performing voice recognition of the target candidate or the candidate number spoken by the user from among the target candidates and the candidate numbers that are displayed in list form by the display control unit, whereby a spoken target candidate recognized by the voice recognition unit or a target candidate associated with a spoken candidate number recognized by the voice recognition unit is selected by the candidate selection apparatus from among the target candidates displayed in list form.

6. A candidate selection method utilizing voice recognition according to claim 5, wherein, when there is no target candidate corresponding to a character string representing a numeral of a candidate number, the association unit does not associate the candidate number corresponding to the numeral with any target candidate, and associates only a target candidate corresponding to a character string representing a numeral coinciding with a numeral of a candidate number with the candidate number whose numeral coincides with the numeral.

7. A candidate selection method utilizing voice recognition according to claim 5, wherein, when there is no target candidate corresponding to a character string representing a numeral of a candidate number, the association unit associates the candidate number corresponding to the numeral with a target candidate corresponding to a character string representing a numeral other than the numeral of the candidate number.

8. A candidate selection method utilizing voice recognition according to claim 5, wherein the target candidates corresponding to the character strings representing the numerals of the candidate numbers include a street number, block number, or house number.

* * * * *